United States Patent [19]
Kaizawa et al.
[11] 3,771,053
[45] Nov. 6, 1973

[54] POTENTIOMETER USING A VOLTAGE FOLLOWER CIRCUIT

[75] Inventors: Yoshihiro Kaizawa, Kawasaki; Sakuji Watanabe, Urawa, both of Japan

[73] Assignee: Nippon Kogaku K.K., Tokyo, Japan

[22] Filed: May 11, 1972

[21] Appl. No.: 252,231

[30] Foreign Application Priority Data
May 17, 1971 Japan .......... 46/32391

[52] U.S. Cl. .......... 324/140 R, 307/297, 307/313
[51] Int. Cl. .......... G01r 7/00, H03k 1/12
[58] Field of Search .......... 324/140; 307/315, 307/313, 297; 330/30

[56] References Cited
UNITED STATES PATENTS

| | | | |
|---|---|---|---|
| 3,319,184 | 5/1967 | McCall | 307/313 X |
| 3,588,851 | 6/1971 | Jordan | 307/315 X |
| 3,533,007 | 10/1970 | Segar | 330/30 |

*Primary Examiner*—Alfred E. Smith
*Attorney*—Joseph M. Fitzpatrick et al.

[57] ABSTRACT

A voltage follower circuit comprises a voltage source, an npn transistor, a pnp transistor, a rectifier element such as npn transistor, and a resistor element. The base of the first-named npn transistor acts as the input terminal of the voltage follower circuit. The base and emitter of the pnp transistor are connected with the collector of the first-named npn transistor and the positive terminal of the voltage source, respectively. The cathode and anode of the rectifier element are connected with the emitter of the first-named npn transistor and the collector of the pnp transistor, respectively, and the point of connection between the anode and the collector of the pnp transistor acts as the output terminal of the voltage follower circuit. One end of the resistor element is connected with the point of connection between the cathode and the emitter of the first-named npn transistor, and the other end of the resistor element is grounded. A pair of such voltage follower circuits are combined to provide a double input potentiometer, which further includes a preset resistor element and an ammeter.

4 Claims, 2 Drawing Figures

POTENTIOMETER USING A VOLTAGE FOLLOWER CIRCUIT

BACKGROUND OF THE INVENTION

1. Field of the Invention

This invention relates to a potentiometer using a voltage follower circuit.

2. Description of the Prior Art

Various types of voltage follower circuit have been proposed. To provide a follower circuit having good characteristics, it would occur to one skilled in the art to employ an operational amplifier as an element of the follower circuit; but this would be costly and obviates ease of assembly of the circuit, particularly when the yield of the resultant integrated circuit is taken into account. Consequently, a circuit well known as an emitter follower (whose input and output are provided by a transistor base and emitter) has come into more use. However, since the offset voltage of the emitter follower (i.e., the difference between input voltage and output voltage) is a logarithmic function of current, the offset voltage depends on the variation in the current flowing to the emitter as the result of an increase or decrease in the input (or output) voltage. In addition, substantial dependence on temperature results from the temperature characteristic of the diode's reverse saturation current.

On the other hand, a follower circuit having a high impedance may be provided by connecting transistors in a fashion such as a complementary symmetrical connection or a Darlington connection (i.e., connection of two pnp or npn transistors combined to form a single equivalent transistor), but this would aggravate the temperature characteristic of the resultant follower circuit.

SUMMARY OF THE INVENTION

Accordingly, we propose, by the present invention, a circuit which facilitates the formation of an integrated circuit and in which offset voltage variation is very small for input voltage variations while the temperature characteristic is improved, and input impedance is high.

We also provide a circuit which enables the potential difference between two inputs to be indicated by an ammeter.

Thus, according to an embodiment of the present invention, we contribute a voltage follower circuit which comprises a voltage source, a first npn transistor having the base thereof acting as the input terminal of the voltage circuit, a pnp transistor having the base and emitter thereof connected with the collector of the npn transistor and the positive terminal of the voltage source, respectively, and a rectifier element having the cathode and anode thereof connected with the emitter of the npn transistor and the collector of the pnp transistor, respectively. The point of connection between the anode of the rectifier element and the collector of the pnp transistor acts as the output terminal of the voltage follower circuit. A resistor element has one end thereof connected with the point of connection between the cathode of the rectifier element and the emitter of the npn transistor. The other end of the resistor element is grounded. The rectifier element may comprise a second npn transistor, whose base and collector are both connected with the collector of the pnp transistor and whose emitter is connected with the emitter of the first npn transistor. The first and second npn transistors are equal in reverse saturation current.

According to another embodiment of the present invention, a pair of such voltage follower circuits are combined to provide a double input potentiometer circuit, which further includes a preset resistor element having one end thereof connected with the output terminal of one of the two voltage follower circuits, and an ammeter having one terminal thereof connected with the other end of the preset resistor element. The other end of the ammeter is connected with the output terminal of the other voltage follower circuit.

BRIEF DESCRIPTION OF THE DRAWINGS

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein.

DESCRIPTION OF THE PREFERRED EMBODIMENTS

Figure 1:
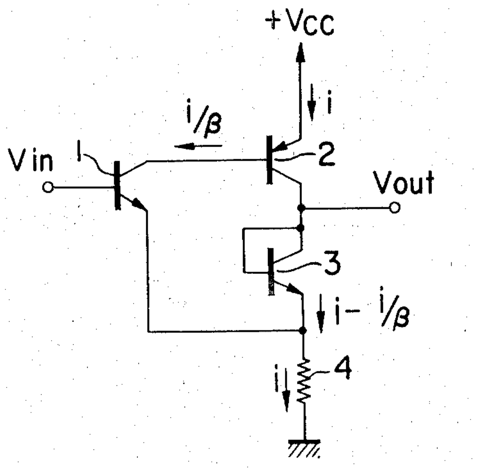
FIG. 1 is a circuit diagram of a voltage follower circuit according to the present invention.

Referring to FIG. 1, the voltage follower circuit, according to a first embodiment of the present invention, includes an element 1 such as npn transistor, an element 2 such as pnp transistor, and an element 3 such as npn transistor or diode. These two npn transistors 1 and 3 are of the same characteristic, i.e., equal in reverse saturation current, and they are hereinafter referred to as "same characteristic elements." The same characteristic element 1 has a current amplification factor $\beta n$ and its reverse saturation current is represented by *is*. The pnp transistor 2 has a current amplification factor $\beta$. The reverse saturation current of the element 3 is equal to *is*. The circuit further includes a resistor element 4 having a resistance value R. The npn transistor 1 has an input Vin at its base and its collector is connected with the base of the pnp transistor 2. The emitter of the transistor 1 is connected with the emitter of the npn transistor 3. The resistor element 4 is connected in series with the point of connection between the transistors 1 and 3, and is also connected with earth potential, i.e., to ground. The npn transistor (or diode) 3 has its base and collector connected together and the point of such connection is connected with the collector of the pnp transistor 2, whose output is represented by Vout. The emitter of the pnp transistor 2 is connected with a source of positive potential +Vcc.

If the current amplification factor $\beta n$ of the npn transistor 1 is selected to a sufficiently great value, say, $\beta n > 1$, and if the current flowing to the pnp transistor 2 and the offset voltage are represented by $i$ and Vo, then the following relations will be established:

$$\mathrm{Vo} = \mathrm{Vout} - \mathrm{Vin}$$

$$= h\ln [ (i - i/\beta)/is] - h\ln [ (i/\beta)/ is] = h\ln (\beta - 1) \quad (1)$$

$$\mathrm{Vin} = h\ln i - h\ln \beta is + \mathrm{R} \times i \quad (2)$$

where $i/\beta > is$ and $h = KT/q$, where $k$ is Boltzman's constant, $q$ the electron charge, and $T$ the absolute temperature.

Thus, by knowing the characteristic of the current amplification factor $\beta$ for the current $i$, the value of $\beta$ for each input voltage may be known from equation (2), since $\beta$ is the function of $i$ or $\beta = \beta(i)$. By applying the known value of $\beta$ to equation (1), the value of the offset voltage Vo may be known. In view of the fact that usually $\beta > 1$, the following relation is established:

$$\mathrm{Vo} \approx h\ln \beta \quad (3)$$

Generally, the current $i$ is less than 1 milliampere, whereas the current amplification factor $\beta$ is the logarithmic function of the current, and thus, as seen from equation (3), the variation in the offset voltage Vo is extremely small for the variation in the current $i$. In addition, the temperature characteristic of the offset voltage Vo is greatly improved over the emitter follower because the amplication factor $\beta$ is much less dependent on temperature than the reverse saturation current $is$. Also, the input current equals $i/(\beta n \times \beta)$, resulting in a high input impedance.

A modified follower circuit of this invention can be attained by replacing the three transistors employed in the aforementioned embodiment by reversing the polarity of the power source. More specifically, such a modified embodiment can be provided by replacing npn transistor 1, pnp transistor 2, and npn transistor 3 in FIG. 1 with a pnp transistor, an npn transistor and a pnp transistor, respectively, and by connecting the positive potential terminal +Vcc of positive potential source to resistor 4, and further by grounding the npn transistor which is substituted for pnp transistor 2 in FIG. 1.

The modified follower circuit thus made has the same technical effect as obtained by the follower circuit shown in FIG. 1.

Figure 2:
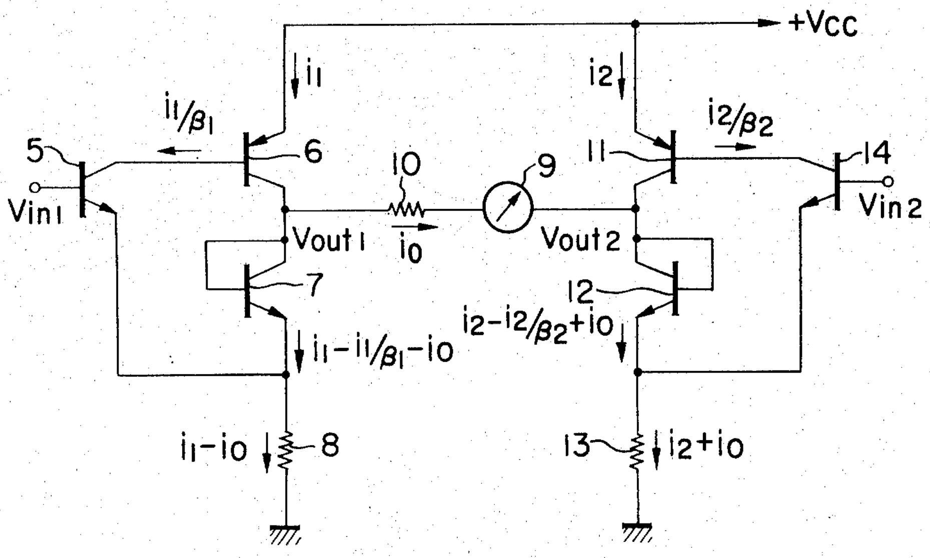
FIG. 2 is a diagram of a double input potentiometer potentiometer circuit provided by combining a pair of voltage follower circuits according to the present invention.

Referring to FIG. 2, there is shown a circuit which comprises a pair of voltage follower circuits similar to that shown in FIG. 1, but arranged so that the potential difference between two inputs may be indicated by an ammeter. The combined circuit includes same characteristic elements 5, 7, 12 and 14 such as npn transistors and same characteristic elements 6 and 11 such as pnp transistors. The current amplification factors of the elements 5 and 14 are $\beta_1 (> 1)$ and $\beta_2 (> 1)$, respectively, and those of the elements 6 and 11 are both $\beta (> 1)$. The circuit further includes resistor elements 8 and 13 having a resistance value R, an ammeter 9 having an internal resistance value substantially equal to zero, and a resistor element 10 including the internal resistance of the ammeter 9 and having a preset resistance value Ro.

The pair of voltage follower circuits are so-combined that the emitters of the pnp transistors 6 and 11 are connected together while the point of connection therebetween is connected with a source of positive potential +Vcc and that the preset resistor 10 and ammeter 9 are serially connected between two output potentials $\mathrm{Vout}_1$ and $\mathrm{Vout}_2$. The two voltage follower circuits have respective input potentials $\mathrm{Vin}_1$ and $\mathrm{Vin}_2$.

If currents $i_1$ and $i_2$ flow to the emitters of the pnp transistors 6 and 11, respectively, and if a current $i_0$ flows from the output $\mathrm{Vout}_1$ to the output $\mathrm{Vout}_2$, then various currents will flow to the various elements, as shown in FIG. 2. At this time, there will be established the following relations:

$$\mathrm{Vout}_1 = \mathrm{Vin}_1 - h\ln i_1/(i_1 - i_0) + h\ln \beta_1 \quad (4)$$

$$\mathrm{Vout}_2 = \mathrm{Vin}_2 - h\ln i_2/(i_2 + i_O) + h\ln \beta_2 \quad (5)$$

$$\mathrm{Vout}_1 - \mathrm{Vout}_2 = \mathrm{R}_O i_O \quad (6)$$

$$\mathrm{Vin}_1 = h\ln(i_1/is\beta_1) + \mathrm{R}(i_1 - i_O) \quad (7)$$

$$\mathrm{Vin}_2 = h\ln(i_2/is\beta_2) + \mathrm{R}(i_2 + i_O) \quad (8)$$

Thus, by knowing the characteristic of the current amplification factor $\beta$ for the current $i$, and with the functional relation that $\beta = \beta(i)$, the unknown values $\mathrm{Vout}_1$, $\mathrm{Vout}_2$, $i_O$, $i_1\ (\beta(i_1))$, $i_2(\beta(i_2))$ in the foregoing simultaneous equations (4) to (8) may be known through repeated approximation (or through graphical solution or electronic computation).

With $\mathrm{Vin}_1 - \mathrm{Vin}_2$ constant, variations in the current $i_0$ will now be examined. It is assumed that the two input potentials are arbitrarily given values $\mathrm{Vin}_3$ and $\mathrm{Vin}_4$ and that $\mathrm{Vin}_1 - \mathrm{Vin}_2 = \mathrm{Vin}_3 - \mathrm{Vin}_4$ (constant).

If the various values $i_0$, $i_1$, $i_2$, $\beta_1$ and $\beta_2$ for the inputs $\mathrm{Vin}_1$ and $\mathrm{Vin}_2$ correspond to the various values $i_{00}$, $i_3$, $i_4$, $\beta_3$ and $\beta_4$ for the inputs $\mathrm{Vin}_3$ and $\mathrm{Vin}_4$, the current variation factor $\Delta i_0/i_0$ will be given by equations (4), (5) and (6), as follows:

$$\frac{\Delta i_0}{i_0} = \frac{-h}{R_0 i_0} \ln \left( \frac{1 - \frac{i_{00}}{i_3}}{1 - \frac{i_0}{i_1}} \cdot \frac{1 + \frac{i_0}{i_2}}{1 + \frac{i_{00}}{i_4}} \cdot \frac{\beta_3}{\beta_1} \cdot \frac{\beta_2}{\beta_4} \right) \quad (9)$$

where $\Delta i_0 = i_0 - i_{00}$. In equation (9), the value in the logarithmic parentheses is substantially equal to 1, and thus the current variation factor $\Delta i_0/i_0$ can be lower than one percent when the source voltage is as low as several volts with the current $i_0$ being of the order of several tens of microampers.

According to the present invention, as has been described above, the voltage follower circuit comprises two npn transistors, a npn transistor and a resistor, and such construction leads to the advantages that variation in the offset voltage is extremely small for a variation in the input voltage, that the temperature characteristic is greatly improved as compared with that of the conventional emitter follower, and that the input impedance is increased.

Further, the double input potentiometer comprising a pair of such voltage follower circuits has no temperature characteristic but has a high input impedance. When the potential difference between two inputs is contant, the indication error of such potential difference is extremely small for any variation in the input voltages. This means that such potentiometer is effective especially for visual metering as in the metering system of a camera whereby an ammeter indicates the potential difference between two inputs to display shutter speed or F-number.

We believe that the structure and operation of our novel circuitry will now be understood, and that its advantages will be fully appreciated by those persons skilled in the art.

What is claimed is:

1. A voltage follower circuit comprising:

*a.* a voltage source;

*b.* a first transistor having the base thereof acting as the input terminal of said voltage follower circuit;

*c.* a second transistor complementary to the first transistor, having the base and emitter thereof connected with the collector of the first transistor and one terminal of the voltage source, respectively;

*d.* a resistor element having one end thereof connected with the emitter of the first transistor and the other end thereof connected with the other terminal of the voltage source; and

*e.* a diode connected forwardly between the collector of the second transistor and the junction of the one end of the resistor element and the emitter of the first transistor, said collector of the second transistor acting as the output of the voltage follower circuit, the reverse saturation current of the diode being equal in value to that of the first transistor.

2. A voltage follower circuit according to claim 1, wherein the first transistor is an npn transistor and the diode is an npn transistor whose base and collector are both connected with said collector of the second transistor and whose emitter is connected with said junction of the one end of the resistor element and the emitter of the first transistor.

3. A double input potentiometer circuit comprising:

*i.* a pair of voltage follower circuits each including

*a.* a voltage source;

*b.* a first transistor having the base thereof acting as the input terminal of said voltage follower circuit;

*c.* a second transistor complementary to the first transistor, having the base and emitter thereof connected with the collector of the first transistor and one terminal of the voltage source, respectively;

*d.* a resistor element having one end thereof connected with the emitter of the first transistor and the other end thereof connected with the other terminal of the voltage source; and

*e.* a diode connected forwardly between the collector of the second transistor and the junction of the one end of the resistor element and the emitter of the first transistor, the reverse saturation currents of the first transistor and the diodes of the respective follower circuits being equal in value, said collector of the second transistor acting as the output of the voltage follower circuit:

*ii.* a preset resistor element having one end thereof connected with the output terminal of one of said pair of voltage follower circuits; and

*iii.* an ammeter having one terminal thereof connected with the other end of said preset resistor element, the other end of said ammeter being connected with the output terminal of the other of said pair of voltage follower circuits.

4. A double input potentiometer circuit according to claim 3, wherein the first transistor of each follower circuit is an npn transistor and the diode of each follower circuit is an npn transistor whose base and collector are both connected with said collector of the second transistor and whose emitter is connected with said junction of the one end of the resistor element and the emitter of the first transistor.

* * * * *